Nov. 1, 1938.  B. MOORE, JR  2,134,884
ROAD ROLLER AND MEANS FOR TRANSPORTING SAME
Filed Nov. 17, 1937
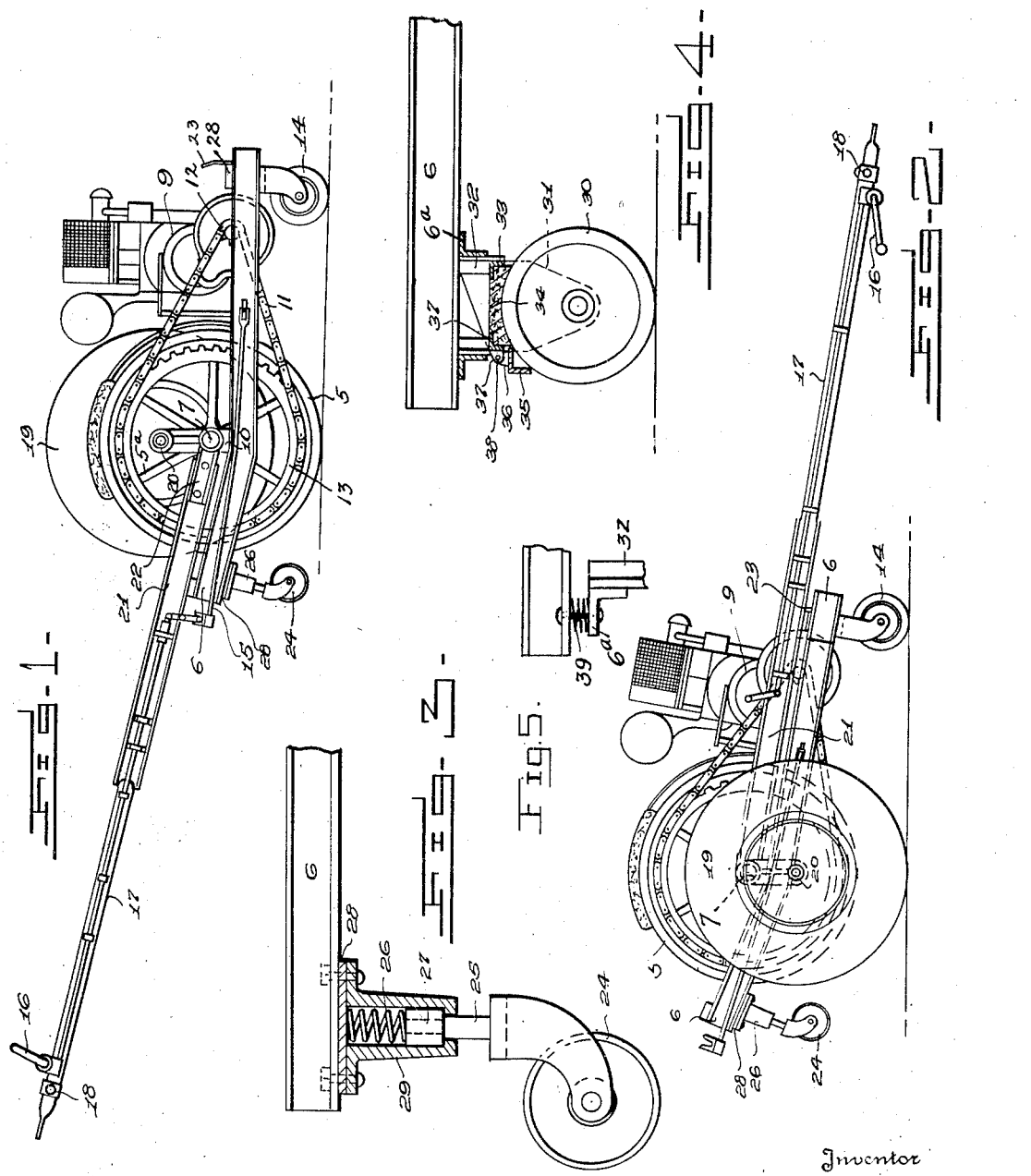
Inventor
Bart Moore Jr.
By Samuel Herrick,
Attorney Patented Nov. 1, 1938

2,134,884

UNITED STATES PATENT OFFICE 2,134,884

ROAD ROLLER AND MEANS FOR TRANSPORTING SAME

Bart Moore, Jr., San Antonio, Tex.

Application November 17, 1937, Serial No. 175,140

11 Claims. (Cl. 94—50)

This invention relates to road rollers of the character of that shown in my co-pending application Serial No. 143,813, filed May 20, 1937.

In my application aforesaid, as in this application, I have disclosed a structure comprising an engine carrying frame in which a road roller is mounted, and a ground wheel carrying frame, the ground wheels being eccentrically disposed with respect to the road roller and the frame of the ground wheels being so articulated with respect to the engine and roller carrying frame that when the tongue is swung bodily over in one direction, the ground wheels are elevated, and the roller is lowered into engagement with the ground, while when the tongue is swung over in the other direction the ground wheels are brought into engagement with the ground and the roller is elevated.

My application aforesaid also discloses a caster wheel for supporting the forward end of the engine carrying frame when the roller is in operation and the device is being guided by hand.

The present invention contemplates the addition, to a structure of the character of that above described, of an auxiliary roller disposed in the rear of the engine carrying frame and normally lying out of engagement with the ground in the forward movement of the machine under the manual guidance of the operator but adapted to be brought into engagement with the ground when the roller is reversed. There are important functional results for the provision of this auxiliary roller, as will be hereinafter set forth.

In the accompanying drawing:

Figure 1 is a side elevation of a road roller of the character described having the invention applied thereto, with the parts in road rolling position;

Fig. 2 is a side elevation with the parts in towing position;

Fig. 3 is a detail view of a roller mounting of the caster type;

Fig. 4 is a detail view of a roller mounting of the non-swiveling type, and

Fig. 5 is a fragmentary view of a spring mounting for the roller of Fig. 4.

Like numerals designate corresponding parts throughout the several figures of the drawing.

In the drawing, 5 designates a road roller which may consist of any suitable number of sections. This roller is mounted to turn with respect to a shaft 7 through spokes 5ª in a usual and known way. An engine and roller carrying frame 6, hereinafter referred to as the engine carrying frame, supports an internal combustion engine, a part of which is indicated at 9. The frame 6 is provided with ears 10, through which the main shaft 7 passes.

The roller may be driven from the engine 9 through the medium of any suitable driving connections, such as the chain 11 and sprocket wheels 12 and 13. The forward end of the engine carrying frame is supported upon a wheel 14, shown as a caster wheel, though the non-swiveling wheel of Fig. 4 is adapted to be used in this location if desired.

A clutch operating mechanism, indicated in a general way at 15, is provided with an operating handle 16, disposed adjacent the outer end of the tongue or draw bar 17 of the ground wheel carrying frame 21. When the parts are in the position illustrated in Fig. 1, the tongue 17 is utilized as a guiding means during the rolling operation, the operator grasping the handle indicated at 18.

With the parts in the position illustrated in Fig. 2, into which relation they have been brought by the mere swinging of the tongue over to the right, the ground wheels 19 have been brought into engagement with the ground and the roller has been elevated from the ground. This is due to the fact that the spindles 20, upon which the ground wheels are mounted, are eccentrically disposed with respect to the shaft 7, these spindles being in turn rigidly affixed to the ground wheel carrying frame 21 through brackets 22. The tongue 17 projects forwardly from the ground wheel carrying frame 21.

With the parts in the position illustrated in Fig. 2, the structure is adapted to be towed behind a truck or other vehicle by connecting the forward end of the tongue 17 to said vehicle. At this time, the engine carrying frame is latched to the ground wheel carrying frame through the medium of a spring tongue indicated at 23.

The present invention contemplates the addition to the engine carrying frame of a supporting roller, mounted upon said frame at a point adjacent the rear end thereof and well to the rear of the shaft 7. During the time that the road roller is being utilized in a forward rolling operation, such for example as compacting asphalt, this auxiliary roller 24 lies out of contact with the ground.

By slightly depressing the tongues 17, the operator may lift the roller 14 out of engagement with the ground and both of the rollers may be held out of engagement with the asphalt during the rolling operation. However, this roller 14 may exercise a rolling function along with the main roller, and it is usually utilized to carry part of the weight of the engine, thus relieving the operator of any labor beyond that of guiding the structure. By the operation of the clutch rod 15, the conventional clutch of the engine may be caused to impart a reverse movement to the main roller, and it is when this is done that the roller 24 comes into play and exercises an important function.

This roller does more than merely act as a support during the reverse movement of the road roller. When the engine is thrown into reverse, it tries to impart reverse movement to the road roller. However, the inertia of this comparatively heavy roller is so great that there is a tendency for the engine to move upwardly and rearwardly with respect to the roller, thus causing the forward end of the engine carrying frame to rise, and that in turn tending to jerk the handle 18 out of the hands of the operator.

By providing the roller 24 at a point upon that side of the engine carrying frame remote from the engine, and by locating this roller so that it never lies more than a few inches from the ground, it follows that any possible downward movement of handle 18 under this reversing action of the engine, is limited, and the handle 18 cannot be jerked far enough downwardly to jerk it out of the hands of the operator or to injure the operator.

The rollers 14 and 24 may be swiveled to constitute casters, and their shanks 25 (see Fig. 3) may be yieldingly mounted by interposing a spring 26 between a collar 27 upon the upper end of said shank and the cap plate 28 of the housing 29 within which said collar is slidably disposed. However, the invention also contemplates the use of a non-swiveling roller 30, disposed in the same relation as the roller 24. This roller may be of any suitable width, and it is mounted between end plates 31, only one of which is shown.

These end plates are carried by vertical angles 32, which in turn support the horizontal angles 33. The vertical angles 32 may be connected to frame 6 by angles 6ª. It is readily possible to yieldingly mount roller 30 with respect to frame 6 by interposing springs 39 between angles 6ª and frame 6, as in Fig. 5.

A cocoa mat swab 34 is held in place by the angles 33 and bears upon the face of the roller. A scraper 35, preferably made of a piece of angle iron, is provided with ears 36. The adjacent horizontal angle 33 of the frame is provided with corresponding ears 37. These ears are traversed by a hinge pin 38. Thus the scraper is hingedly mounted, and it tends to ride constantly into contact with the face of the roller.

It is to be understood that the invention is not limited to the precise arrangements shown, but that it includes within its purview whatever changes fairly come within either the terms or the spirit of the appended claims.

Having described my invention, what I claim is:

1. In combination with a device of the character described comprising an engine carrying frame and a road roller therein and a ground wheel carrying frame pivoted with respect to the engine carrying frame and adapted to be swung over from one side to the other of the road roller, said frame carrying ground wheels that are eccentrically disposed with respect to the road roller; of a supporting roller for that end of the engine carrying frame remote from the engine disposed upon the opposite side of the road roller from that occupied by the engine and arranged to resist the tendency of the forward end of the engine carrying frame to rise under the influence of the engine upon reversal of the rotation of the road roller when in rolling operation.

2. A structure as recited in claim 1, in combination with a yieldable mounting for said roller with respect to the engine carrying frame.

3. A structure as recited in claim 1 wherein said roller is of the caster type and comprises a yieldable mounting with respect to the engine carrying frame.

4. In a structure as recited in claim 1, the combination with a supporting roller disposed beneath the forward end of the engine carrying frame.

5. A structure as recited in claim 1 wherein said roller is provided with a non-swiveling mounting.

6. A structure as recited in claim 1 wherein the mounting for said roller with respect to the engine carrying frame comprises a pair of opposed, horizontally disposed, spaced angle irons, bearing plates and means for securing said bearing plates to the ends of said angle irons, a swab held in place by said angle irons, and a scraper supported from the face of one of said angle irons, and lying upon the face of the roller.

7. A structure as recited in claim 1 wherein said roller is of the caster type and comprises a shank, a collar upon said shank, a vertical housing affixed to the engine carrying frame, and a spring within the housing bearing upon said collar.

8. A structure as recited in claim 1 in combination with a supporting roller disposed beneath the forward end of the engine carrying frame, and means for yieldably mounting both of said rollers with respect to the engine carrying frame.

9. A structure as recited in claim 1, in combination with a supporting roller disposed beneath the forward end of the engine carrying frame, and means for mounting both of said rollers to swivel.

10. A structure as recited in claim 1, in combination with a supporting roller disposed beneath the forward end of the engine carrying frame, means for mounting both of said rollers to swivel, and means for mounting both of said rollers yieldingly with respect to the engine carrying frame.

11. A structure as recited in claim 1, in combination with a frame in which the roller is mounted for non-swiveling movement, and means for yieldingly mounting said frame with respect to the engine carrying frame.

BART MOORE, Jr.